May 28, 1929.  W. R. AUGSBURY ET AL  1,714,653
HEADLIGHT CONTROL MECHANISM
Filed Feb. 19, 1927   2 Sheets-Sheet 1
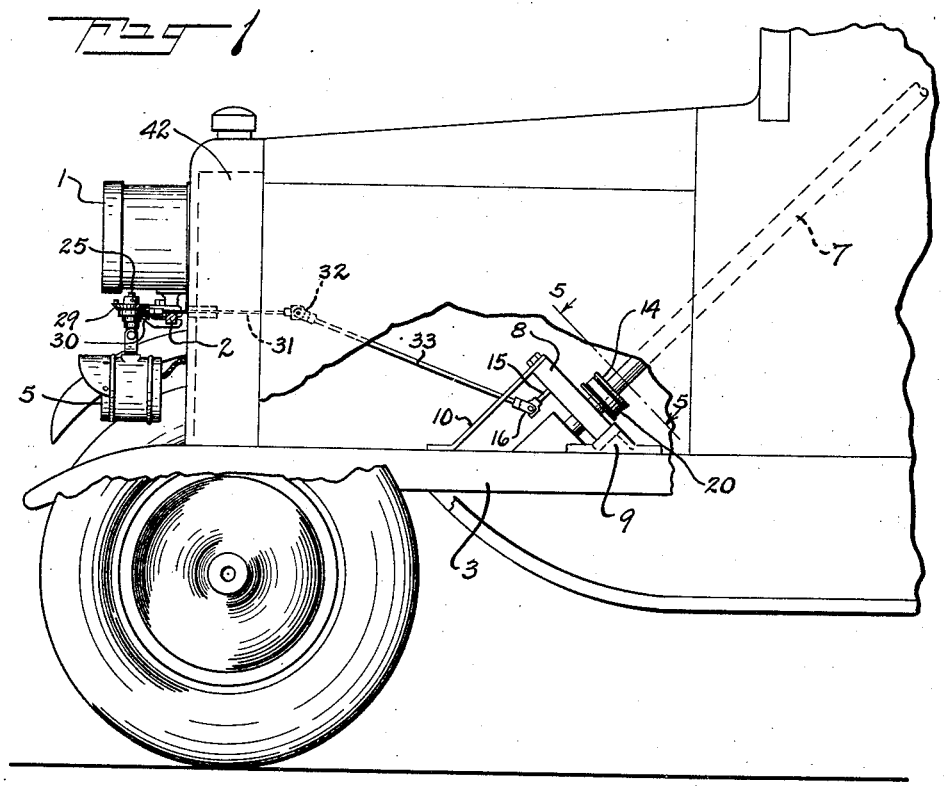
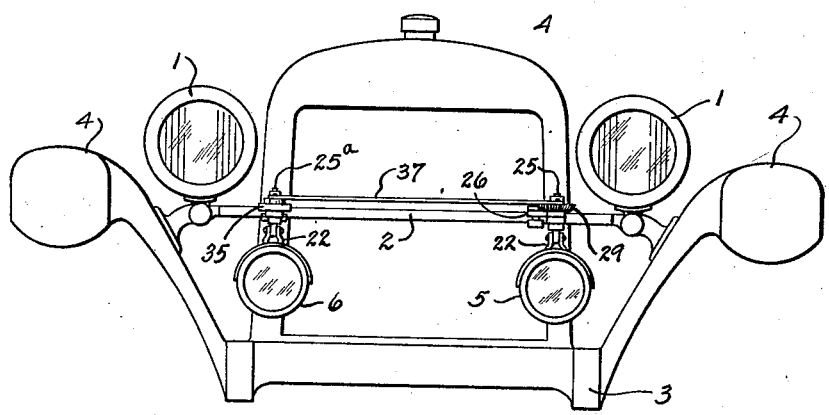

May 28, 1929. W. R. AUGSBURY ET AL 1,714,653
HEADLIGHT CONTROL MECHANISM
Filed Feb. 19, 1927  2 Sheets-Sheet 2

INVENTORS
W. R. Augsbury
BY A. Pulbrecht
John D. Morgan
ATTORNEY

Patented May 28, 1929.

1,714,653

UNITED STATES PATENT OFFICE.

WELLINGTON REID AUGSBURY AND ALVIN RUBRECHT, OF GRANVILLE, NEW YORK.

HEADLIGHT-CONTROL MECHANISM.

Application filed February 19, 1927. Serial No. 169,547.

The invention relates to automobiles, and more particularly to headlight control mechanism, actuated by the steering wheel post, to insure that one or more headlights will turn with the steering wheel post.

Objects and advantages of the invention will be set forth in part hereinafter and in part will be obvious herefrom, or may be learned by practice with the invention, the same being realized and attained by means of the instrumentalities and combinations pointed out in the appended claim.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a side elevation of an automobile equipped with our invention, parts being broken away for purpose of clearer illustration;

Fig. 2 is a front elevation of Fig. 1, with certain parts omitted;

Figure 3:
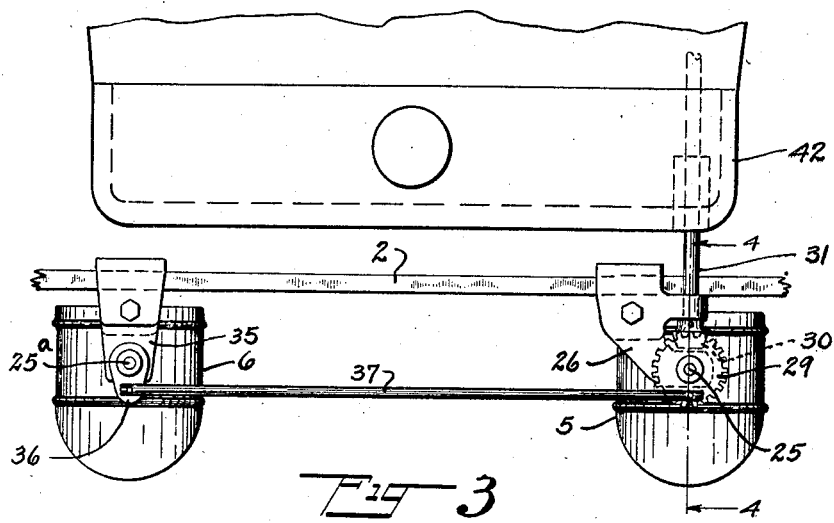
Fig. 3 is an enlarged fragmentary plan view, with certain parts omitted for clearer illustration.

It is well known that on winding or circuitous roads, having sharp turns, the ordinary headlights 1, 1 which are secured on the lamp rod 2, which rod in turn is secured to the front fenders 4, 4, only move with the chassis 3 of the automobile. This makes night driving over a winding road extremely hazardous to the driver and dangerous to pedestrians or other users of the road, because the fixed headlights 1, 1 will not focus on the road until the entire car or truck has made the turn.

By our invention we employ one or more pivoted headlights 5, 6 which may be either used alone, or in connection with ordinary headlights 1, 1, or may be used as ditch lights, depending upon the particular exigencies of the road. By our invention, these headlights 5 and 6 are positively moved by the steering wheel post 7 as that post is actuated by the steering wheel, not shown.

The invention is directed to providing a control mechanism for dirigible headlights on an automobile, such mechanism being certain and positive in its action, having no parts which can be disturbed or affected by ordinary vibration or even a severe shock to the automobile, and at the same time being adapted for ready attachment and use with any type of automobile. The latter construction avoids the necessity for making any changes in the structure of the automobile, since the demountable and attachable features are embodied in the control mechanism. The invention is further directed to providing a control mechanism, as above outlined, which will be entirely above the automobile or chassis frame and protected from dirt and weather.

By our invention the actuating mechanism is concealed almost entirely within the hood, the few parts that are exposed not detracting from the beauty of the car or its lines. Our operating mechanism being mounted mostly in the hood and above the frame and operated directly by the steering wheel post, cannot become clogged with mud or snow and needs practically no cleaning.

Various forms of mechanism may be used to embody our invention. In the drawings we have shown one embodiment in which one pivoted headlight 5, or two such pivoted headlights 5 and 6, are suspended by the same connecting lamp rod 2, upon which are mounted the regular rigid headlights 1, 1.

Figure 5:
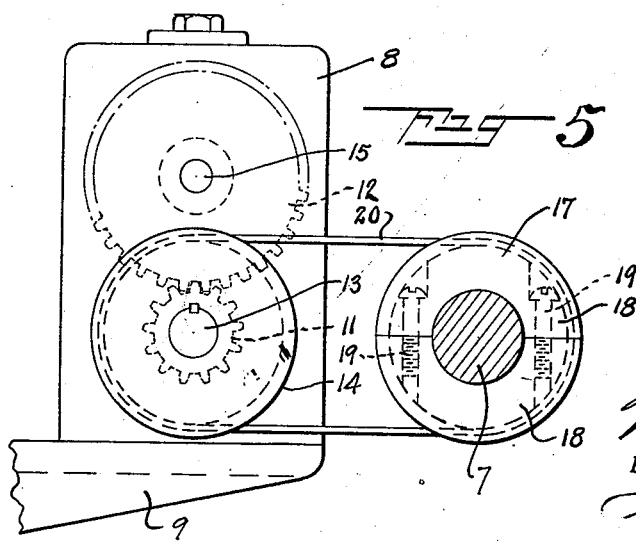
Fig. 5 is a section on line 5—5 of Fig. 1, looking in the direction of the arrows.

Near the lower end of the steering wheel post 7 we mount a gear box 8 by means of the bracket 9 and support 10 both secured to the chassis 3. Within the gear box 8 are mounted gears 11 and 12 (Fig 5). The gear 11 is mounted on a stub shaft 13 which extends out of the box in the direction of the dash; and upon this shaft 13 is mounted a pulley 14. The other gear wheel 12 is mounted on a stub shaft 15 extending forward from the box 8 towards the radiator, to which shaft is connected the universal joint 16. These gears 11 and 12 are operated directly by the lower end of the steering wheel post 7. Various means may be employed to connect the steering wheel post with the gear 11. We have shown one such connection, but, of course, our invention is not to be confined to this particular form. We preferably use a split pulley 17, formed in two sections 18, 18, clamped to the steering post 7 by means of the screws 19, 19. The belt 20 cooperates with the split pulley 17 on the steering wheel post and the pulley 14 on the stub shaft 13 so that partial rotation of the steering wheel post 7, operated by the steering wheel (not shown), will be transmitted by the belt 20 to the pulley 14, shaft 13, gear 11, gear 12, stub shaft 15, and to the universal joint 16. Instead of the pulleys 17 and 14 and a belt 20, it, of course, is to be understood that two sprocket wheels and a sprocket chain, or two gears may be employed.

Figure 4:
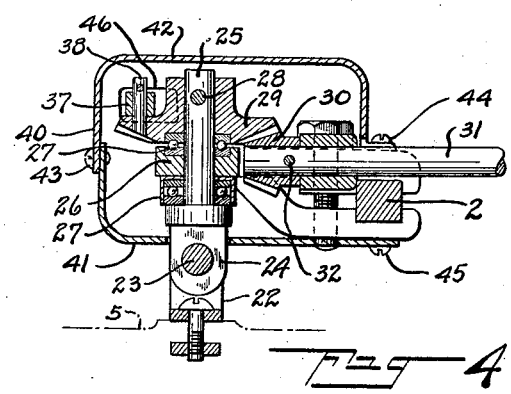
Fig. 4 is a vertical section on the line 4—4 of Fig. 3, on an enlarged scale, with the addition of a cover, which is preferably though not necessarily employed.

The headlight 5 is secured to the support 22 which, in turn, is mounted on a pin 23 passing through a hole in the head 24 of the arbor or axle 25. This arbor 25 is supported by a bracket 26 secured to the lamp rod 2. Between the fixed bracket 26 and the axle or arbor 25 are ball bearings 27 (Fig. 4). Keyed to the end of the axle or arbor 25, by the pin 28, is a bevel gear 29 in mesh with the bevel pinion 30, keyed on the axle 31 by the pin 32. This axle 31 extends through the radiator 42 and is provided at its end with a universal joint 32. A rod 33 connects the universal joint 32 with the universal joint 16.

In the mechanism so far described, it will be clear that operating the steering wheel (not shown), either to the right or left, will correspondingly rotate the steering wheel post 7 and cause the bevel gears 30 and 29 to partially rotate the axle or arbor 25 to which the headlight 5 is connected, so that, that headlight will be moved automatically in the direction that the car is steered. This insures that the road on each and every turn will be illuminated, immediately upon the turning of the steering wheel and before the lights from the main headlights 1, 1 will function, thereby permitting the driver to always see the road immediately ahead of him, regardless of how winding it may be.

Preferably we employ another headlight 6 pivotally mounted in the same manner by a similar bracket 35. On the axle or arbor 25ª connected to the lamp we mount a lever 36, pivotally connected to a connecting rod 37, this rod being secured to the bevel gear 29 by means of the pin 38 (Fig. 3). It will be clear from this arrangement that a partial rotation of the gear 29, to move the headlight 5, will also, at the same time, move the other headlight 6 a corresponding degree. While we preferably use two such headlights, it is of course to be understood that we may only use one headlight 5, and that these headlights 5 and 6 may be used either with or without the fixed headlights 1, 1.

To protect the bevel gears 29 and 30 we may, in some cases, employ a cover 40 formed of the two sections 41, 42 secured together by the screw 43, and secured to the support by the screws 44 and 45. When such a cover is used the end of the connecting rod 37 will pass through a slot 46 in the cover. A similar cover 40 may be used in connection with the other headlight 6.

The invention in its broader aspects is not limited to the specific mechanisms shown and described but departures may be made therefrom within the scope of the accompanying claim without departing from the principles of the invention and without sacrificing its chief advantages.

What we claim is:

An apparatus for controlling automobile headlights including in combination a fixed headlight supported by a rigid member, a rotatively mounted headlight suspended from said supporting member, gearing above the rotatable headlight for controlling the rotation thereof, a standard steering wheel post having a split pulley or the like detachably mounted thereon, gearing driven by the split pulley, and positive driving connections from the gearing driven by the split pulley to the gearing above the rotatable headlight.

In testimony whereof, we have signed our names to this specification.

WELLINGTON REID AUGSBURY.
ALVIN RUBRECHT.